Nov. 28, 1939.　　　　G. N. LEVESQUE　　　　2,181,516
MILLING MACHINE
Filed Jan. 24, 1938
Fig.1
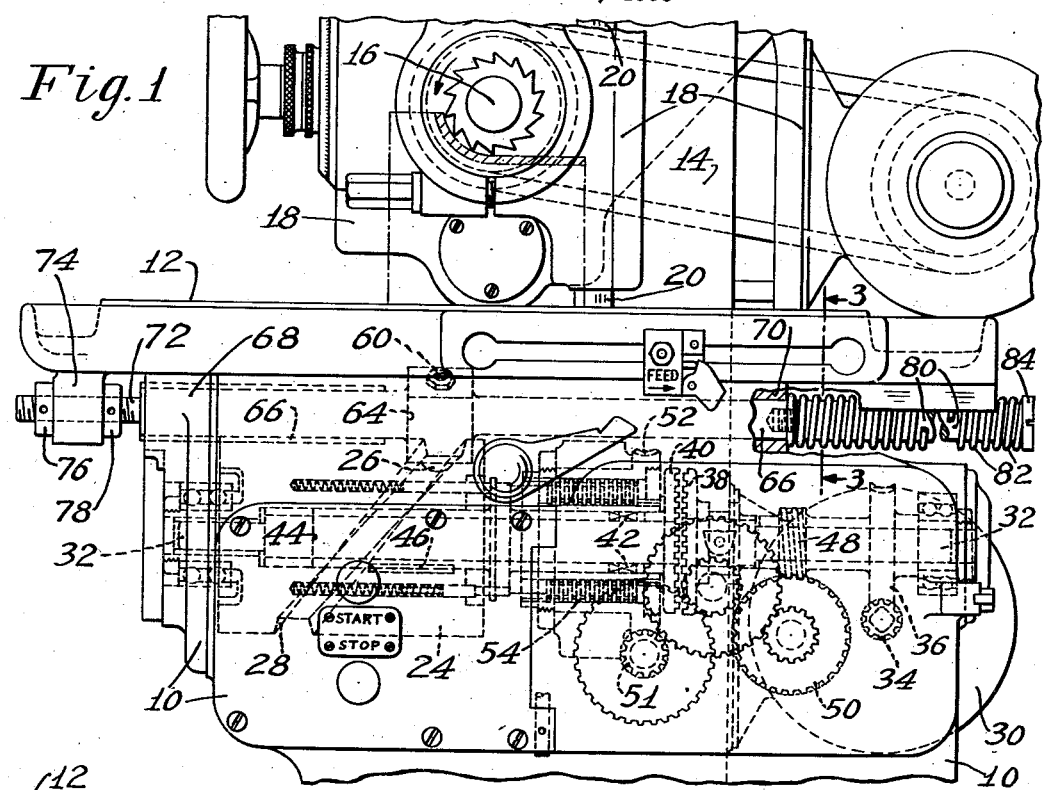
Fig. 2
Fig. 3
Witness
Charles T. Olson
Inventor
George N. Levesque
by Fish Hildreth
Cary & Jenney attys.
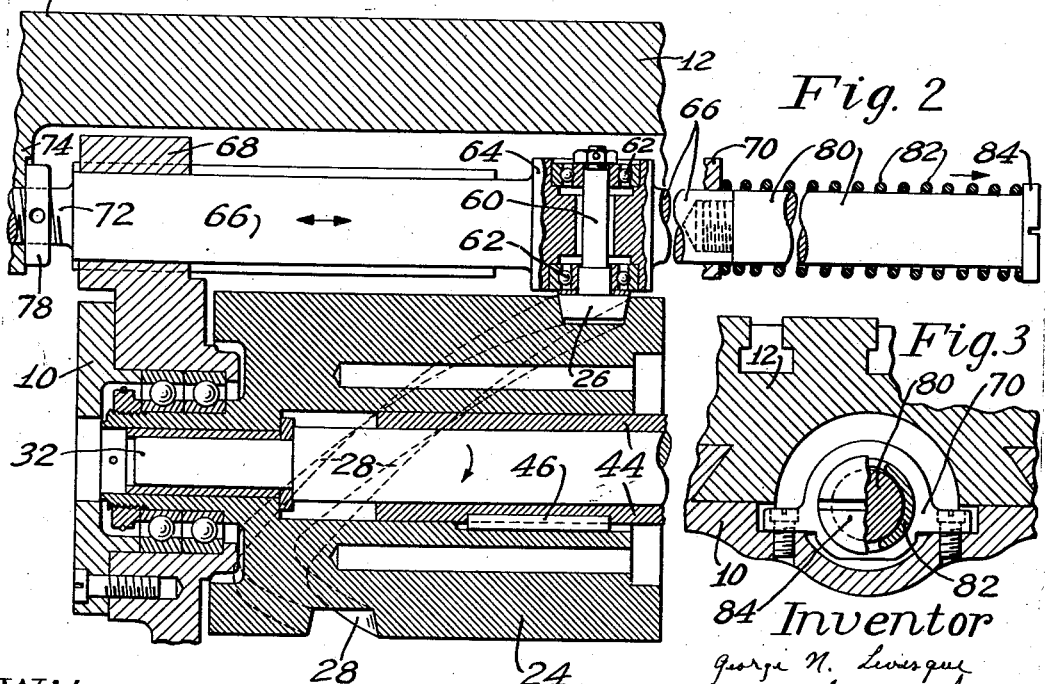

Patented Nov. 28, 1939

2,181,516

UNITED STATES PATENT OFFICE 2,181,516

MILLING MACHINE

George N. Levesque, Providence, R. I., assignor to Brown and Sharpe Manufacturing Company, a corporation of Rhode Island Application January 24, 1938, Serial No. 186,538

5 Claims. (Cl. 90—22)

The present invention relates to improvements in milling machines, and more particularly to mechanism for eliminating backlash in the cam and follower driving connections for reciprocating the work table in a milling machine of the cam actuated type.

The machine hereinafter particularly described as embodying in a preferred form the several features of the invention, includes a rotary cutter spindle which is vertically adjustable toward and away from the work, and a work table reciprocable to effect relative translatory movements of the cutter and work, and cam driving connections for the table including a cam follower secured to move with the table, and a cylindrical table feed cam which is driven continuously in one direction to effect the reciprocation of the table.

It is a principal object of the invention to provide in a milling machine of this general description, novel and improved means for eliminating backlash in the driving connections for reciprocating the table, and more particularly in those portions of the driving connections intervening between the cylindrical driving cam and the table.

Specifically it is an object of the invention to provide in a machine of this general description, mechanism which is particularly adapted for eliminating backlash in the driving connections between the driving cam and the table during the performance of a hook milling operation.

With these and other objects in view as may hereinafter appear, one feature of the invention consists in the provision of spring means constructed and arranged to act directly against the table to urge the table and follower continuously in the same direction in which that portion of the milling cutter proximate to the work is moved, whereby the follower is maintained continuously in engagement with that side of the cam track which supports the follower and table against the force exerted by the cutter in the performance of a milling operation.

Another feature of the invention consists in the provision of mechanism for eliminating backlash in the cam driving connections for the table, more particularly during the performance of a hook milling operation, this mechanism consisting of spring means acting against the table to urge the table and follower continuously in the direction of feed and in advance of the feed cam track, so that the follower is maintained continuously in engagement with the leading side of the cam track considered in the direction of feed to provide a positive engagement of the connections intervening between the table and the driving cam to eliminate backlash in these connections during the performance of a hook milling operation. With this construction and arrangement of the driving connections for the reciprocable work table, the movement of the table in the direction of feed is accomplished by said spring means, the feed cam operating at this time only to control the rate of feed, and to provide a positive support for the table and intervening driving connections against the cutting stroke of the milling cutter.

The several features of the invention consist also in the devices, combinations and arrangement of parts hereinafter described and claimed, which together with the advantages to be obtained thereby will be readily understood by one skilled in the art from the following description taken in connection with the accompanying drawing, in which Fig. 1 is a view in front elevation of a manufacturing type cam actuated milling machine with a portion of the casing broken away to illustrate particularly the spring means for urging the table in the direction of feed; Fig. 2 is an enlarged sectional view of the table feed cam and follower connections to the work supporting table including the spring means for eliminating backlash in these connections; and Fig. 3 is a detail sectional view taken on the line 3—3 of Fig. 1, illustrating particularly one of the bearings for the table follower supporting shaft.

The machine disclosed in the drawing as embodying in a preferred form the several features of applicant's invention, consists of a base 10 having slidably mounted thereon a reciprocable work table 12, a vertically extending column 14 forming a rigid unit with the base 10, a rotary cutter spindle 16, and a spindle carriage 18 vertically adjustable on ways 20 provided on the column 14.

The driving connections for the table include a cylindrical driving cam 24 supported in the base 10, and a follower 26 supported to move with the table 12, and for engagement in a closed feed and return cam track 28 formed in the periphery of the drive cam 24. The cam 24 is driven continuously in one direction by means of an electric motor 30 through a transmission which includes a high speed and a slow speed gear train, a change speed clutch, and overrunning devices operative when the clutch is shifted to high speed position to permit the overrunning of the slow speed drive. The driving connections as generally indicated in dotted lines in Fig. 1, include a drive shaft 32 supported co-axially with the driving cam 24, and arranged to be driven from the motor 30 through a worm 34 and worm gear 36. The driving cam 24 is driven at a rapid rate from the shaft 32 through connections which include a clutch member 38 splined to the shaft 32, and arranged to engage with a driven high speed clutch member 40. A cam toothed driving connection 42 operatively connects the driven member 40 with a sleeve member 44 loosely mounted on the shaft 32 and connected by means of key 46 to drive the cam drum 24. The cam drum 24 is driven at a relatively slow rate from the shaft 32 through reduction gearing including a worm 48 on the shaft 32, worm gear 50, and a number of pick-off reduction gears which in turn drive a slow speed worm 51 and worm gear 52 supported co-axially with the shaft 32. The worm gear 52 is normally connected to drive the connecting sleeve member 44 and cam drum 24 at a slow rate through a multiple disk friction clutch generally designated at 54.

The driving connections above described including the slow speed friction clutch 54, are constructed and arranged to cause the slow speed clutch to be automatically disengaged to permit the over-drive of the cam drum 24 upon the shifting of the high speed clutch 38 into operative engagement with the driven high speed clutch member 40. Inasmuch as these driving connections do not form specifically any part of the present invention, and are fully described and illustrated in a copending application of Englund, filed of even date herewith, no further description thereof is believed necessary.

The machine herein described, and as more particularly set forth in the copending application above referred to, is constructed and arranged for operation in accordance with an automatic cycle in which the table is moved from its start position at the extreme left at a fast or traverse rate, is slowed prior to the engagement of the cutter with the work, and at the completion of the cutting stroke in which the table is in a position at the extreme right as shown in Figs. 1 and 2, is again returned to its start position to the left at the faster rate.

As shown particularly in Fig. 2 of the drawing, the follower 26 through which lengthwise reciprocatory movements are imparted to the table, is mounted on the lower end of a vertically extending pin 60 supported by means of ball bearings 62 in a bearing support 64 in a horizontally disposed shaft 66 connected for longitudinal movement with the table. The shaft 66 is slidably supported in bearings 68 and 70, having a splined engagement with the bearing 68 to prevent rotational movement of the shaft. At its left hand end the shaft 66 is provided with a reduced screw-threaded portion 72 which passes through a journal formed in a depending lug 74 on the under side of the table 12, and is rigidly secured thereto by means of two lock nuts 76 and 78 engaging against opposite sides of the lug 74.

In a cam actuated milling machine of this general description, in which the reciprocatory movement of the table is effected by the engagement of a follower with a closed cam track formed in the periphery of the driving cam, it has been found extremely difficult to entirely eliminate looseness or play in the driving connections which results, particularly when the machine is set up for hook milling, in an uneven or jerky feed of the table, and results in the production of inferior work. This unevenness in the table feed is the result of the reaction of the milling cutter on the work which in hook milling tends to drive the table in the direction of and in advance of the table feed connections. The word "closed" in this connection is employed to denote a groove type cam which supports the follower against movement in either direction, as opposed to an open type cam against which the follower is held by a spring. Applicant's spring is arranged to cooperate with a cam driven milling machine having as an essential element thereof, a closed cam track or groove adapted to positively control both the feeding and return movements of the driven support.

In accordance with a principal feature of the present invention, mechanism is provided for controlling the operation of the work supporting table 12 in such a manner as to maintain a tight operating connection through the driving connections during movement of the table in the direction of feed against the force exerted by the milling cutter, so that all backlash or play in these connections is entirely eliminated. To this end the supporting shaft 66 for the follower 26, is fitted at its right hand end with an extension 80 which provides support for a compression spring 82 coiled about the extension 80 and engaging at one end against a flanged end portion 84 of the extension 80, and at its other end against the stationary bearing 70. The spring 82 acts at all times to urge the supporting shaft 66 and table 12 to the right to maintain the follower 26 against the right hand or leading side of the cam track 28 considered in the direction of feed. With this construction and arrangement of the driving connections for the table 12, it will be seen that the feeding movement of the table 12 to the right, is effected by the operation of the spring 82, the rate of feed movement being determined by the engagement of the follower 26 with the leading side of the cam track 28.

It will be understood that the invention is not limited to the specific embodiment shown, and that various deviations may be made therefrom without departing from the spirit and scope of the appended claims.

What is claimed is:

1. In a milling machine having a rotary cutter spindle, driving means for the spindle, a reciprocable work table and cam actuated driving connections for the table including a rotatable cam drum having formed in the periphery thereof a closed feed and return cam track, and a cam follower engaging in said cam track, means supporting the follower to move with the table, and take-up means for said cam actuated driving connections acting to urge the table continuously in the same direction in which that portion of the milling cutter proximate to the work is moved whereby the follower is maintained continuously in engagement with that side of the cam track which supports the follower and table against the force exerted by the cutter in the performance of a milling operation.

2. In a milling machine having a rotary cutter spindle, driving means for the spindle, a reciprocable work table and cam actuated driving connections for the table including a rotatable cam drum having formed in the periphery thereof a closed feed and return cam track, and a cam follower engaging in said cam track, means supporting the follower to move with the table, and spring take-up means constructed and arranged to act directly against the table to urge the table and follower continuously in the same direction in which that portion of the cutter proximate to the work is moved whereby the follower is maintained continuously in engagement with that side of the cam track which supports the follower and table against the force exerted by the cutter in the performance of a milling operation.

3. In a milling machine having a rotary cutter spindle, a reciprocable work table and cam actuated driving connections therefor including a rotatable cam drum having formed in the periphery thereof a closed feed and return cam track, and a cam follower engaging in said cam track, means supporting the follower to move with the table, and spring take-up means to eliminate backlash in the table driving connections for hook milling acting to urge the table and follower continuously in the direction of feed whereby the table and follower are caused to lead the actuating cam in the direction of feed to maintain the follower continuously in engagement with the leading side of the cam track considered in the direction of feed.

4. In a milling machine having a rotary cutter spindle, a reciprocable work table and cam actuated driving connections for the table including a rotatable cam drum having formed in the periphery thereof a closed feed and return cam track, and a cam follower engaging in said cam track, a bar support for the follower rigidly secured for movement with the table, and take-up spring means to eliminate backlash in the table driving connections for hook milling acting on said bar support to urge the table and follower continuously in the direction of feed whereby the table and follower are caused to lead the actuating cam in the direction of feed to maintain the follower continuously in engagement with the leading side of the cam track considered in the direction of feed.

5. In a milling machine having a rotary cutter spindle, a reciprocable work table and cam actuated driving connections therefor including a rotatable cam drum having formed in the periphery thereof a closed feed and return cam track, and a cam follower engaging in said cam track, a bar support for the follower rigidly secured for movement axially with the table, and a removable backlash eliminator attachment for eliminating backlash in said table driving connections for hook milling, comprising an extension member attachable to said bar support, and a compression spring coiled about said extension between a shoulder thereon and a stationary part of the machine acting to urge the table and follower continuously in the direction of feed whereby the follower is maintained continuously in engagement with the leading side of the cam track considered in the direction of feed.

GEORGE N. LEVESQUE.